United States Patent

[11] 3,628,661

| [72] | Inventor | Edward A. Codo |
| | | Joliet, Ill. |
| [21] | Appl. No. | 14,484 |
| [22] | Filed | Feb. 26, 1970 |
| [45] | Patented | Dec. 21, 1971 |
| [73] | Assignee | Caterpillar Tractor Co. |
| | | Peoria, Ill. |

[54] FILTER ASSEMBLY WITH IMPROVED BYPASS VALVE REGULATING MEANS
10 Claims, 2 Drawing Figs.

[52] U.S. Cl. ............................................. 210/130
[51] Int. Cl. ..................................... B01d 35/14
[50] Field of Search ............................................. 210/130

[56] References Cited
UNITED STATES PATENTS
| 3,221,880 | 12/1965 | Wilkinson | 210/130 |
| 3,314,542 | 4/1967 | Kudlaty | 210/130 |

*Primary Examiner*—Frank A. Spear, Jr.
*Attorney*—Fryer, Tjensvold, Feix, Phillips & Lempio

ABSTRACT: A filter assembly is provided with a bypass valve which is connected by floating support means to a removable cover. The valve is adapted to rest within the end of a filter element and constructed so that the valve-actuating pressure is independent of filter length.

PATENTED DEC 21 1971

3,628,661

INVENTOR
EDWARD A. CODO

BY
Fryer, Tjensvold, Feix, Phillips & Lempio
ATTORNEYS 3,628,661

FILTER ASSEMBLY WITH IMPROVED BYPASS VALVE REGULATING MEANS

BACKGROUND OF THE INVENTION

The present invention relates to a filter assembly and pertains more particularly to a bypass valve for a filter assembly.

Hydraulic circuits and oil lubricating systems generally employ filters to remove contaminants from the fluid. Because of the need for a continuous supply of fluid and to prevent rupture of the filter element and a consequent contamination of the fluid, these filter assemblies are provided with a bypass valve. The bypass valve is set to open when flow through the filter becomes so clogged as to cause a predetermined pressure rise in the fluid circuit. The opening of the valve permits fluid to bypass the filter element to supply the demands of the system. A signal device is normally provided to signal when the bypass valve is open.

Heretofore known bypass valves have been mainly of two types. One type is built into the housing, and has the disadvantages of consuming valuable space and being relatively inaccessible for cleaning and servicing. Another type is designed to fit into the end of the filter cartridge for ready accessibility, but is held in place by a biasing spring which also determines the valve-opening pressure. With such valves the opening pressure normally varies with the length of the filter element which may vary within permissible tolerance up to a one-fourth of an inch. This can affect the regulation of the valve-biasing spring, causing it to open too soon, which would indicate a clogged filter before the filter was dirty enough to change, or causing the pressure to rise above the normal permissible differential before the valve opens. Such an excess of pressure could cause rupture of the filter element and result in damage to other components in the hydraulic system from the contaminants released by the rupture.

SUMMARY OF THE INVENTION

It is therefore a primary object of the present invention to provide a filter assembly having a pressure responsive bypass valve whose pressure responsiveness is independent of the filter length.

It is a further object of the present invention to provide a bypass valve for a filter assembly, wherein the valve extends into the center of the filter element and the valve bias is independent of deviations in filter length.

A still further object of the present invention is to provide a filter assembly having filter support means and a bypass valve floatingly carried by a removable cover for easy access.

In accordance with the invention, the bypass valve and filter support assembly is floatingly carried by a removable cover and arranged so that the valve-seating pressure is independent of any variation in the length of the filter element.

BRIEF DESCRIPTION OF THE DRAWINGS

The above and other objects and advantages will become apparent from the following specification when read in conjunction with the attached drawings in which.

DETAILED DESCRIPTION OF THE DRAWINGS

Figure 1:
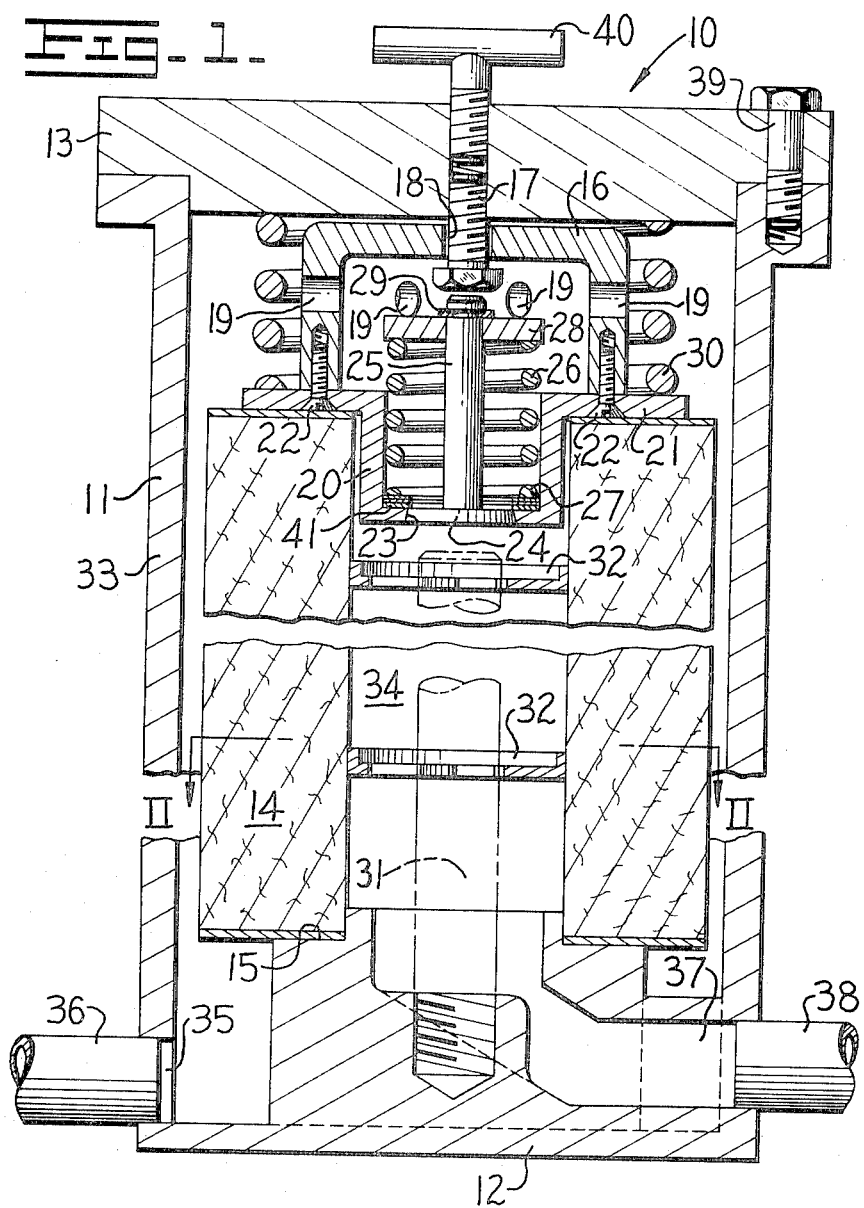
FIG. 1 is a longitudinal sectional view of a filter assembly embodying the present invention.
Figure 2:
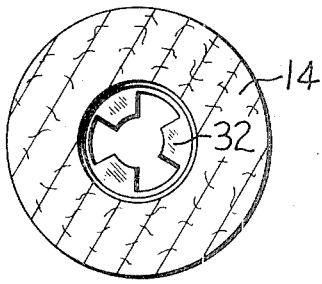
FIG. 2 is a sectional view along lines II—II of FIG. 1.

Referring now to the drawings and especially to FIG. 1, there is illustrated a filter assembly 10 incorporating the present invention. The assembly comprises a housing 11 having an end wall 12, a removable cover 13, and defining a substantially cylindrical chamber. An annular filter element 14 is positioned within housing 11 with one end supported against annular shoulders 15 on wall 12 and the other end is supported by floating support means 16. Support means 16 is carried by cover 13 and attached loosely connected thereto by means of a capscrew 17 extending through hole 18 in such a manner as to permit considerable freedom of movement between support means 16 and cover plate 13. This freedom of movement can be adjusted by means of screw 17. Support means 16 contains a plurality of ports or openings 19 to permit a free flow of fluid therethrough. A valve body member 20 having an annular flange 21 is connected such as by means of screws 22 to support means 16. Cylindrical valve body member 20 extends into the central bore of the filter element 14 and includes an aperture 23 formed in the end thereof to define a valve seat. A suitable valve element comprising a circular disc element 24 and a stem 25 is fitted in valve body 20 and biased to the normally closed position by means of a spring 26. The valve-biasing spring 26 is held into position against shoulder 27 on valve body member 20 and a disc 28, held in place by a snapring 29 on the end of valve stem 25. The preload or bias of spring 26 and thus, the actuating pressure of the valve may be regulated by the insertion or removal of shims 41. A spring 30 biases shoulder 21 into sealing engagement with the upper end of filter element 14. Spring 30 is also confined between flange 21 and cover 12 to prevent loss thereof when the cover is removed. It should be noted that the flange 21 is permitted considerable leeway in its position by means of a floating support 16. The bias of spring 26 which seats valve 24 is however independent of the position of flange 21. Thus, the set preload of spring 26 remains constant regardless of the length of a filter element 14.

Although a single filter element 14 is illustrated, in many installations the housing 11 is constructed with sufficient length to accommodate a plurality of filter elements. In such a situation, proper alignment of the filter elements may be accomplished by providing the housing with a central guide rod 31 for engaging reenforcing rings 32 normally disposed in the central bore of the filter element 14.

The housing 11 is divided by means of a filter element 14, an annular chamber 33 and a central chamber 34. An inlet port 35 is connected by means of a conduit 36 to a source (not shown) of fluid which is supplied to chamber 33. An outlet port 37 is coupled by means of a conduit 38 to a source (now shown) in demand of filter fluid from chamber 34.

During normal operation fluid admitted through conduit 36 passes into chamber 33 and surrounds the filter element 14. With valve 24 remaining in a closed position, the fluid will flow because of differential pressure through the walls of filter element 14 into the central chamber 34 and through outlet port 37 into conduit 38. When the flow through the walls of filter element 14 become restricted, the fluid pressure in annular chamber 33 and above valve element 24 begins to rise and when it reaches a predetermined level, the valve element 24, in response to the predetermined pressure, moves downward out of seat 23 permitting the fluid to flow through the open valve, thus bypass the filter element 14. The cover 13 is attached to housing 11 in any suitable manner such as by means of a plurality bolts 39, and is provided with a suitable handle 40 attached thereto in any suitable manner such as by screw threads.

What is claimed is:
1. A filter assembly, said assembly comprising:
   a. a housing enclosed to define a cylindrical filter chamber:
   b. one end of said housing including a removable cover:
   c. floating support means attached to said cover for supporting an annular filter element:
   d. a valve body member attached to said support means said support means including an annular shoulder and biasing means to retain an annular seal in engagement with the end of an annular filter element:
   e. a substantially circular seat formed in said valve body:
   f. a valve element adapted to be biased into engagement with said seat: and,
   g. biasing means operatively connected to said valve element for biasing said valve element into engagement with said seat.

2. The assembly as defined in claim 1 wherein said valve body is substantially cylindrical and extends axially into said filter element.

3. The assembly as defined in claim 2 including:

a. a valve seat formed in the end of said cylindrical body member extending into said filter element;

b. a valve element comprising a disc portion adapted to fit into said seat and a stem extending therefrom axially along the axis of said cylindrical portion; and c. spring means operatively engaging one end of said valve body member and said stem for biasing said valve element into said seat.

4. The assembly as defined in claim 3 including shim means engaging said spring means for adjusting the bias thereof.

5. The assembly as defined in claim 1 wherein said floating support means includes means to retain said annular shoulder spaced adjustably from said cover and pretensioning said seal-biasing means.

6. The assembly as defined in claim 1 herein the seating bias of said valve element is independent of the distance of said valve seat from said cover.

7. The assembly as defined in claim 1 wherein the seating bias of said valve element is independent of the length of said filter element.

8. The assembly as defined in claim 1 including means to adjust said biasing means.

9. In a filter assembly, said assembly comprising:

a. a housing having walls defining a substantially cylindrical filter chamber;

b. said housing including a removable cover defining an end wall;

c. support means for supporting an annular filter element coaxially within said housing;

d. said filter element defining an annular chamber and a central cylindrical chamber within said housing;

e. an inlet opening for supplying fluid to said annular chamber;

f. an outlet opening for transmitting fluid from said central chamber to said fluid circuit;

g. said support means comprising a floating member attached to said removable cover;

h. means for biasing said floating member toward said filter element and including an annular shoulder for supporting an annular seal in engagement with one end of said filter element;

i. a valve body member attached to said floating support member and including a cylindrical portion adapted to extend axially into said filter element; and, j. valve means carried by said cylindrical portion and including pressure responsive means adapted to open said valve in response to predetermined pressure in said annular chamber.

10. The assembly as defined in claim 9 including means to adjust said means for biasing said floating member.

* * * * *